(No Model.)  3 Sheets—Sheet 1.

J. A. BRILL.
MOTOR TRUCK.

No. 535,352. Patented Mar. 12, 1895.

Witnesses,
C. W. Benjamin
William Jacobsen

Inventor,
John A. Brill
by Joseph L. Levy
atty (No Model.) 3 Sheets—Sheet 2.

J. A. BRILL.
MOTOR TRUCK.

No. 535,352. Patented Mar. 12, 1895.

Witnesses:
C. W. Benjamin.
William Jacobsen.

Inventor:
John A. Brill
by Joseph L. Levy
atty.

(No Model.) 3 Sheets—Sheet 3.
J. A. BRILL.
MOTOR TRUCK.
No. 535,352. Patented Mar. 12, 1895.
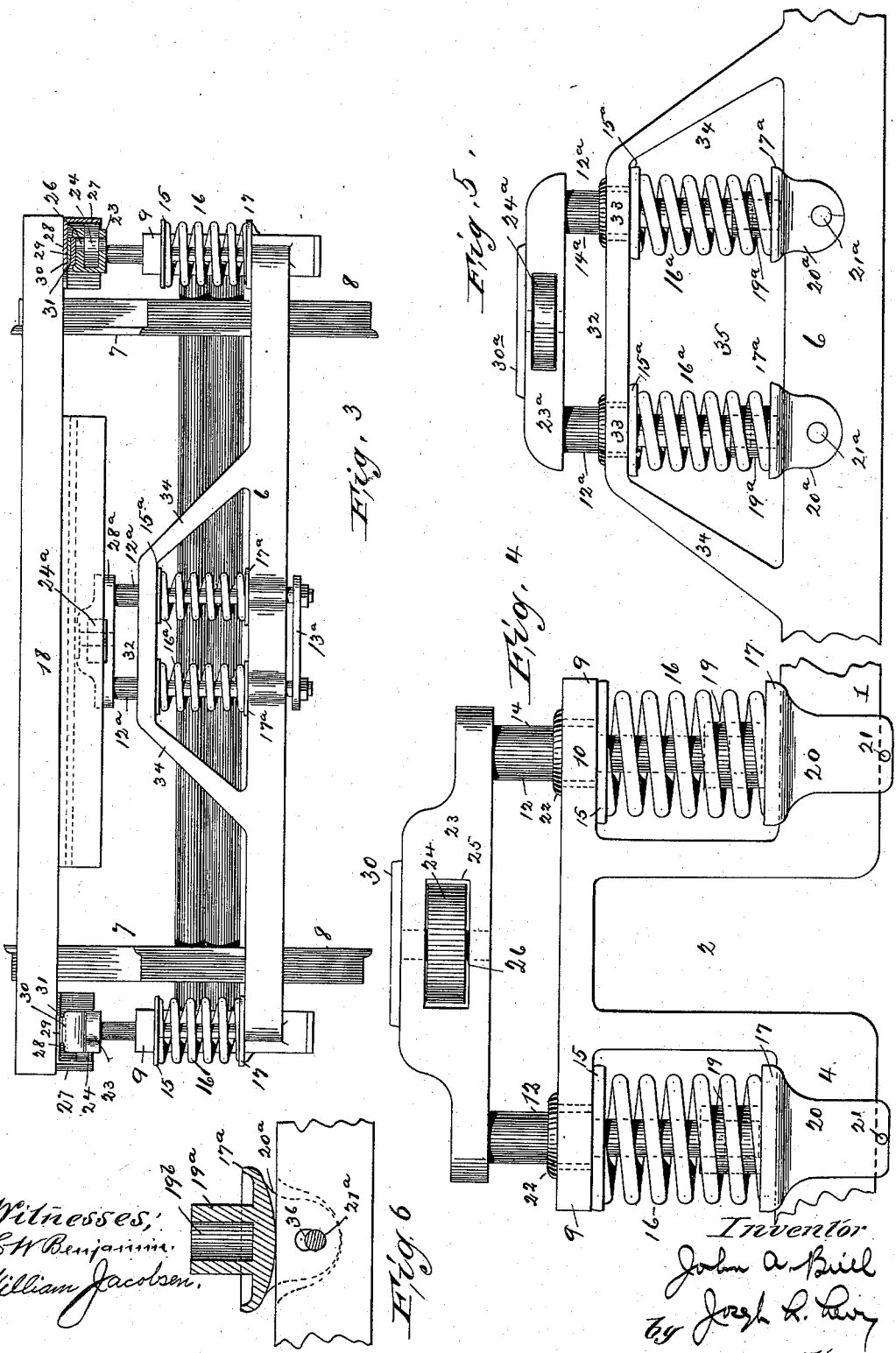
Witnesses:
C. W. Benjamin
William Jacobsen
Inventor
John A. Brill
by Joseph R. Levy
atty.

UNITED STATES PATENT OFFICE.

JOHN A. BRILL, OF PHILADELPHIA, PENNSYLVANIA.

MOTOR-TRUCK.

SPECIFICATION forming part of Letters Patent No. 535,352, dated March 12, 1895.

Application filed January 3, 1894. Serial No. 495,486. (No model.)

*To all whom it may concern:*

Be it known that I, JOHN A. BRILL, a citizen of the United States, residing at Philadelphia, in the county of Philadelphia and State of Pennsylvania, have invented certain new and useful Improvements in Motor-Trucks, of which the following is a specification.

My invention relates more particularly to the class of trucks that have side and end bearings for the car body, and wherein the pivotal or swiveling devices for the car body are connected with said side and end bearings.

The object of the invention is to simplify and improve the general arrangement and construction of the truck frame, the side and end bearings for the car body and the swiveling or pivotal connections therefor.

The invention consists in the novel details of improvement, and the combination of parts that will be more fully hereinafter set forth and then pointed out in the claims.

Reference is to be had to the accompanying drawings forming part hereof, wherein—

Figure 1:
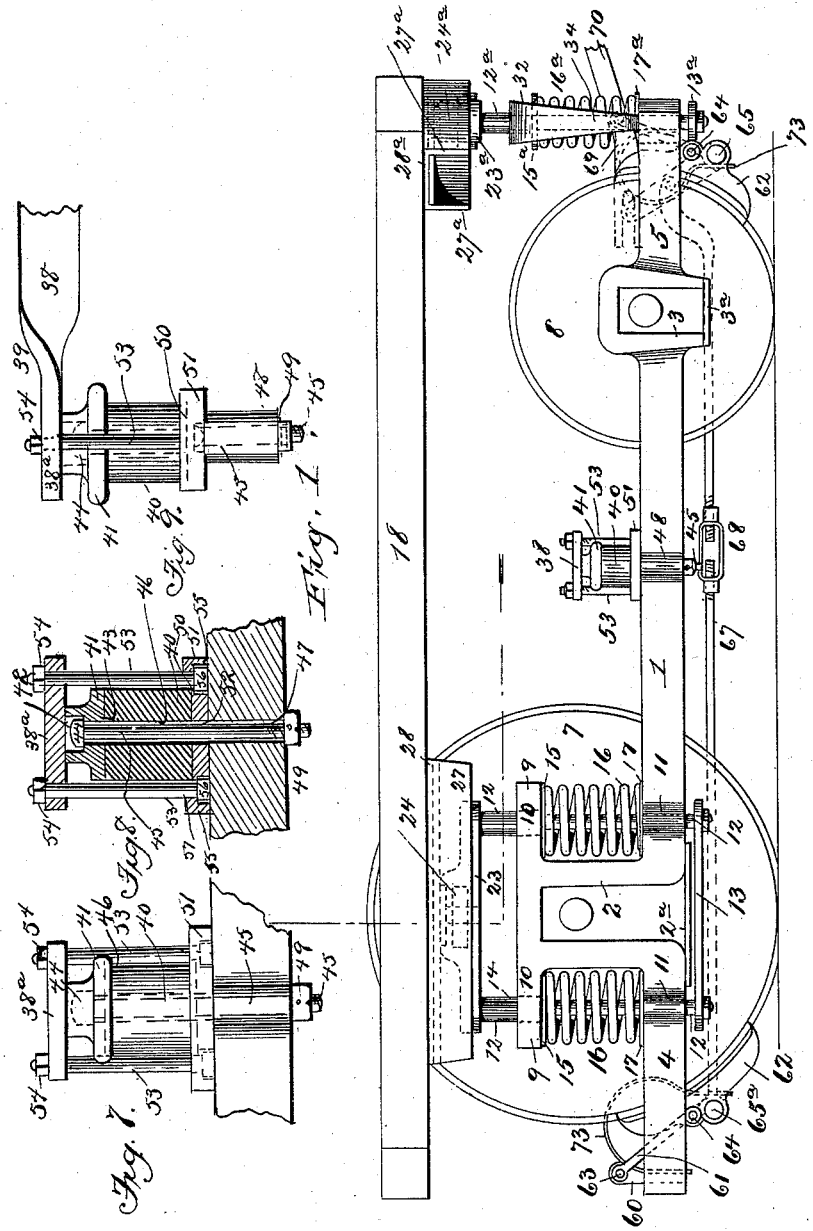
Figure 2:
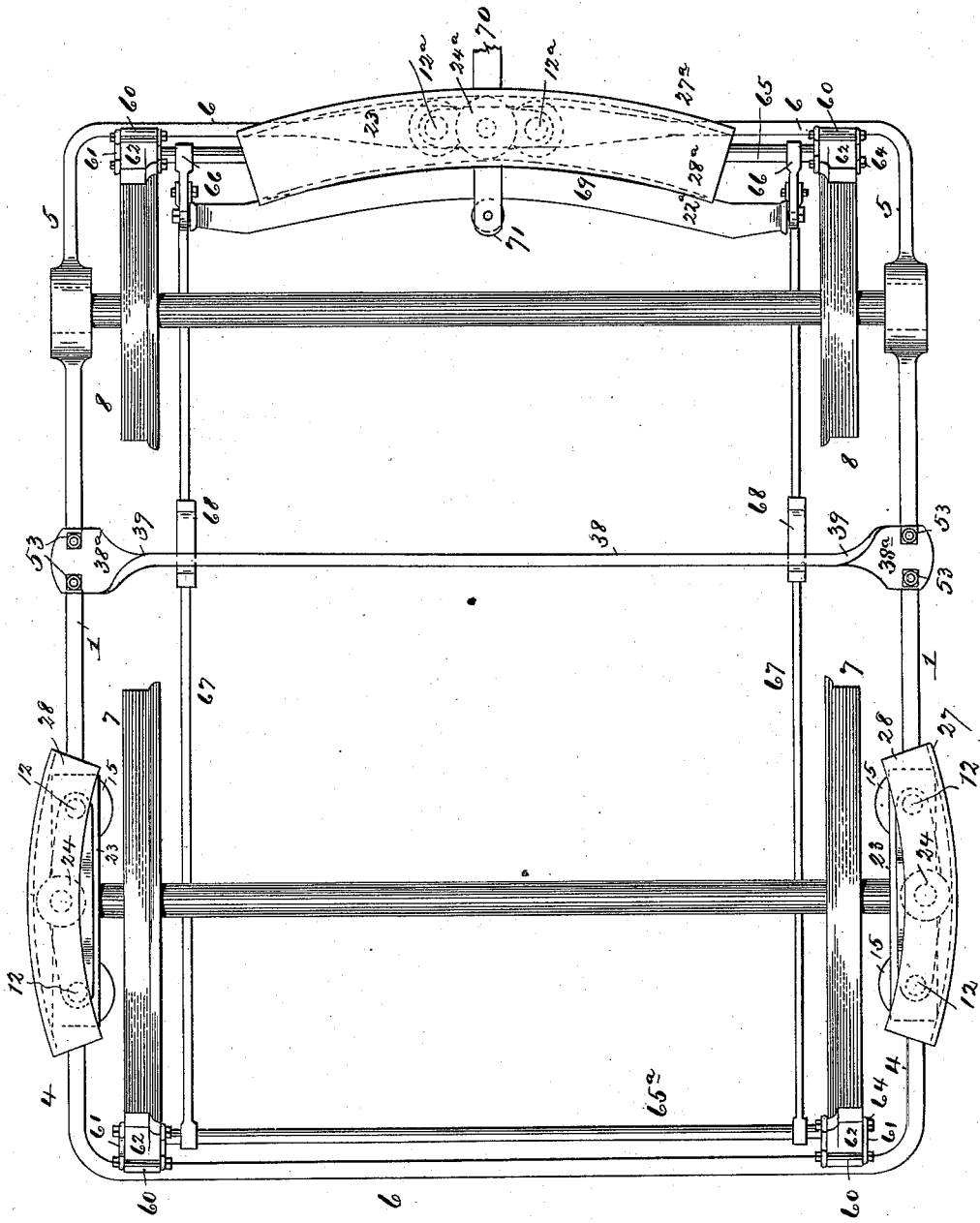

Figure 1 is a side elevation of the truck complete. Fig. 2 is a plan view thereof. Fig. 3 is an end view of the truck looking from the right in Fig. 1. Fig. 4 is an enlarged detail view of the truck side springs, axle box yoke and side bearings for the car body. Fig. 5 is an enlarged detail view of the truck end springs and car body bearings. Fig. 6 is a sectional detail view of one of the end bearing post receiving sockets. Fig. 7 is an enlarged detail view showing the means for providing a cushioned connection between the truck side bars and the motor supporting cross bar. Fig. 8 is a detail sectional view thereof. Fig. 9 is a detail edge view looking from the right in Fig. 7.

In the accompanying drawings, in which similar numerals of reference indicate corresponding parts in the several figures, 1 indicates the side bars of the truck. 2, 3 are the axle box yokes connected with said side bars, in which axle boxes are secured in the usual way.

4, 5 are extensions of the side bars connected with the yokes 2, 3, and 6 are the truck cross bars uniting the extensions 4, 5, the above parts together forming the axle box frame.

By reference to Fig. 2 it will be seen that the parts 1, 2, 3, 4, 5 and 6 are all formed in a homogeneous piece of metal by forging, casting or the like, and that the yoke 2 extends above the plane of the yoke 3. (See Fig. 1.) By this means large driving wheels 7 and smaller trailing or guiding wheels 8 and their axle boxes are accommodated.

On opposite sides of the yoke 2 and at its upper part are longitudinally extending arms 9, 9, said arms lying above and in line with the side bars 1 and extensions 4, the arms and contiguous parts of the side bars forming pedestals for the side bearings and spring posts to be described. The arms 9, 9 are shown as formed integral with the yokes 2, and thus integral with the metal of the axle box frame. In the arms 9 are apertures 10 that are aligned with corresponding apertures 11 in the side bars 1 and extensions 4. (See Fig. 1.)

12 are spring posts that pass through the apertures 10 and 11 and extend above the arms 9 and below the bars 1 and extensions 4, where they are connected by the brace bars 13, the posts 12 thus lying on opposite sides of the yokes 2. The posts 12 are enlarged or shouldered at their upper parts 14, where they pass through the apertures 10 in the arms 9, and said shouldered parts of the post 12 rest upon or engage plates 15 that are supported by the car body springs 16. The springs 16 are shown coiled around the posts 12 and supported by the side bars 1 and extensions 4, said springs preferably resting upon plates 17 lying on said side bar and extension. By this means the car body 18 may be spring supported at its sides, and the spring posts 12 have vertical movement in the arms 9, 9, side bars 1 and extensions 4.

In Fig. 4 I have shown a slightly different arrangement for guiding the lower parts of the posts 12. In this instance the plates 17 have upwardly projecting recessed studs or castings 19 into which the lower ends of the posts 12 project, and have vertical movement therein. The plates 17 also carry depending arms or webs 20 that straddle the side bars 1 and extensions 4, said arms or webs 20 passing below the side bars 1 and extensions 4 as shown.

21 are pins or rods that connect the respective pairs of arms 20 and lie against the under sides of the side bars 1 and extensions 4, whereby the plates 17 are held in position on their respective side bars 1 and extensions 4.

22 are apertured bushings set in the apertures 10 of the arms 9, through which the posts 12 pass.

The car body (or its sills) 18, which may be of suitable construction, is to be pivotally supported by the posts 12, and for this purpose the posts 12 are connected in pairs by side bearings 23 that coact with rub plates on the car body. The bearings 23 are shown provided with horizontal friction rollers 24 that are shown placed in horizontal recesses 25 in the outer sides of the bearings 23, and provided with pivots 26 carried by said bearings. The rollers 24 are adapted to bear against flanges 27 which depend from the rub plates 28 that are carried by the car body or sills 18. The flanges 27 and rub plates 28 are curved to correspond to the pivotal or swiveling movement of the truck beneath the car and lie in an arc described around the pivotal center of the truck.

29 and 30 are friction plates located between the bearing 23 and plates 28 to take up wear at that point, and the plate 30 is shown lying in a recess 31 in the top of the bearing 23. (See Fig. 3.) By this means the plate 30 is held in position on the bearing 23, and may be readily removed and replaced when desired.

The above described bearings and rub plates constitute the pivotal devices between the car truck and the car body, and within certain limits may act as drawing devices.

By having the side bearings adjacent the large wheels the major portion of the weight of the car body is thrown thereon, whereby greater power of traction is derived on the drive wheels. By having the posts 12 on opposite sides of the axle box yokes 2 the weight of the car body is evenly distributed on opposite sides of the axle, whereby the axle box frame is more evenly balanced and the tendency to tilt or pound on the track is reduced. I also use car body supporting and pivotal or swiveling devices at the end of the truck or axle box frame, which devices also act as drawing means between the truck and car body.

In Figs. 1, 2, 3 and 5 I have shown devices between the cross bar 6 of the axle box frame and the car body 18 which substantially correspond to the truck side supporting devices. In this case of course no axle box yoke is used, but the spring posts $12^a$ in Fig. 3 are shown passing through suitable apertures in the cross bar 6 of the truck or axle box frame and connected together by a tie rod $13^a$ in manner substantially similar to the arrangement of the posts 12 in Fig. 1. The springs $16^a$ and plates $15^a$ and $17^a$ are also shown arranged similarly to those on the sides of the truck, but the means for guiding the upper parts of the posts $12^a$ on the cross bars 6 are different in some particulars. On the cross bar 6 is a bridge, pedestal or elevated bar 32 having bushed apertures 33 to receive the posts $12^a$. (See Figs. 3 and 5.) This bridge or pedestal 32 is elevated above the cross bar 6 and lies parallel thereto, and may be wider than said cross bar (see Figs. 1 and 2) to provide proper bearings for the enlarged upper parts $14^a$ of the posts $12^a$. The bridge or elevated pedestal or bar 32 is supported by upwardly extending arms, bars or braces 34 which are carried by the cross bar 6, and in Figs. 3 and 5 are shown inwardly and upwardly inclined and tapered (see Fig. 1) whereby lightness and strength are combined. The bridge 32 and bars or braces 32, 34 are shown made integral with or derived from the metal of the axle box frame, whereby a strong structure is produced, separate parts being thus dispensed with. By this means danger of detachment of the bridge 32 from the cross bar 6 is prevented and the life and utility of the structure is increased. The cross bar 6, bridge 32 and bars or braces 34 together bound a space 35, within which the car body end springs $16^a$ are located, whereby said springs are protected and a strong structure is produced. With this construction, also, the car body 18 will be limited in its up and down swinging motion by contact with the bridge or pedestal 32.

In Figs. 5 and 6 the plates $17^a$ are shown in the form of cradles resting on the cross bar 6, that is to say, the under sides of said plates are curved or rounded so that they can rock on the cross bar 6, and their studs $19^a$ are provided with sockets $19^b$ which receive the lower ends of the posts $12^a$ to allow said posts to have up and down motion therein. The plates $17^a$ also have downwardly projecting arms or webs $20^a$ that straddle the cross bar 6, and said cross bar may be provided with an elongated slot 36 into which projects a pin $21^a$ that is carried by the arms $20^a$, whereby said plate or cradle is carried by said cross bar 6 so that it may rock thereon. However, the slot and pin may be omitted.

The end posts $12^a$ are to have a pivotal or swiveling, as well as a drawing, connection with the car body 18, and for this purpose said posts are connected by a bearing $23^a$ having a friction roller $24^a$ and rub plate $30^a$, all arranged substantially similarly to the parts 23, 24 and 30. At the end of the car body 18, on its under side, is a rub plate $28^a$ to act with the bearing $23^a$, and said rub plate $28^a$ is channeled or provided with two depending plates or webs $27^a$, between which the bearing $23^a$ lies and against which the roller $24^a$ works, the latter in this case projecting from opposite sides of the bearing $23^a$. The plates $27^a$ and $28^a$ are curved in the arc of a circle described around the pivotal center of the truck beneath the car body, so that the bearing $23^a$ will allow proper swiveling action of the truck. A rub plate $29^a$ may be used with the plate $28^a$ similarly to the plate 29, and the plate $30^a$ may be secured to its bearings 23ª similarly to the connection of the plate 30 with the bearing 23.

It will be observed that the end bearings 12ª, 32, &c., lie in the longitudinal center of the axle box frame, and that no springs are used between the axle box yokes 3 and the sides of the car body. By this means the weight of the car body is thrown upon the large wheels, and by making the end springs 16ª of lesser carrying capacity than the side springs 16, the throwing of the maximum of the weight of the car body upon the large wheels is assured. By placing the drawing devices at the end of the truck adjacent to the small wheels the latter are kept upon the track and pounding of the small wheels is prevented or reduced. Thus the weight upon the axle box frame is so distributed and the parts so organized as to produce the maximum of efficiency of the related structure. This will be found of great advantage in rounding curves as the weight is at all times evenly distributed on the axle box frame, and as a portion of the weight is carried on the extensions 4 the small wheels are relieved from a large amount of weight which materially assists the truck in passing around curves. The bearings at the sides and end can have swinging connection with the respective parts to provide for the inequalities in the track.

With the arrangement above described the rub plate or draw head 27ª and bearing 23ª form a drawing device between the car body and the truck or axle box frame so that in whichever direction the truck is moved by the motor positive connection will be made with the car body, the same effect taking place as the car passes around curves. Thus the car body is spring supported at the sides adjacent to the large or driving wheels, as well as at the end between the smaller or trailing wheels. By this means the construction and arrangement is simplified without sacrificing strength and durability. The open ends of the yokes 2, 3 may be connected by tie bars 2ª and 3ª.

It is evident that any suitably arranged motive power may be used to propel the car, and for the purpose of supporting one part of a motor from the side bars 1 of the axle box frame, so as to reduce concussion and shocks, I have shown the following arrangement which broadly forms the subject matter of the application of Walter S. Adams, filed November 9, 1893, Serial No. 490,438, to which cross reference is made, and is only shown in this case to make a complete truck for motor use.

38 is a cross bar extending between the side bars 1, 1 and connected therewith preferably by a cushioned or flexible connection. I have shown a flat bar 38 placed on edge and near its ends it is twisted at 39 and turned at right angles to the main part forming a horizontal part 38ª.

The cross bar 38 rests on or is sustained by cushions or springs 40 that are carried by the side bars 1, 1, and said cushions are shown provided with caps 41 that are interposed between the bar 38 and said cushions 40. The cap 41 is shown provided with a central bore 42 having an internal shoulder 43, within which bore and upon which shoulder rests the head 44 of a bolt 45. (See Fig. 8.) The cap 41 has a hollowed under part within which the cushion 40 rests, and the cushion or spring 40 has a central bore 46 through which the bolt 45 passes. The bolt 45 also passes through an aperture 47 in the side bar 1, the side bar at that part preferably having a swelled part 48 to provide for the passage of the bolt 45 without reducing the strength of the side bar. The nut 49 on the bolt 45 lying under the side bar 1 holds the bolt 45 and cushion 40 in the proper place.

The cushion 40 is shown resting in a recess 50 in a plate 51 carried on the side bar 1, the plate 51 having an aperture 52 for the passage of the bolt 45, the apertures 42, 46, 52 and 47 all being aligned in their respective parts for the reception of the bolt 45. The cross bar 38 is shown receiving two bolts 53 that lie on opposite sides of the cushion 40, and pass freely through said cross bar, the nuts 54 for said bolts 53 lying against said bar. (See Fig. 8.) The bolts 53 at their opposite parts are connected with the plate 51, so as to lift the latter against the resistance of the cushion 40 when the bar 38 rises. For this purpose the plate 51 is shown provided with recesses 55 to receive the heads 56 of the bolts 53, said bolts also passing through apertures 57 in the plates 51. The cap 41 has side recesses 58 in which the bolts 53 rest, whereby said bolts can lie close to the cushion 40.

With the above arrangement the motor (not shown) can be suitably connected with the cross bar 38 for the purpose of sustaining it, and therefore the weight will be supported by the cushions 40 on the side bars 1. Now, if the bar 38 has a downward movement the cross bar will approach the side bars 1, and the caps 41 will be pressed upon the cushions 40 which will be compressed to relieve the shock, and the bolt 45 can slide freely within the aperture 47 in the side bar 1. If the cross bar 38 should rise the bolts 53 will lift the plate 51 against the cushion 40, and as the bolt 45 holds the cap 41 from upward movement, the cushion 40 will be compressed to relieve the shock or strain. Thus in either direction of movement up or down the cross bar is flexibly held and the jar on the motor incident to the travel of the truck is greatly relieved. The holes through which the bolt 45 passes are enlarged so as to permit the cross bar 38 and cushion to swing or move on the side bar within certain limits. The cushion 40 may be made of rubber or of any other desired spring like or elastic material.

It is evident that the details of construction and the arrangements of parts may be altered or changed without departing from the spirit of my invention.

Having now described my invention, what I claim is—

1. In a truck, an axle box frame, having side bars and axle box yokes connected therewith, and extensions connected with the yokes, one of said yokes having arms or pedestals projecting in opposite directions from said yoke, spring posts guided in said pedestals, springs encircling said posts, bearings in said posts, a car body, and rub plates on the car body engaging said bearings to make a movable connection between the truck and car, substantially as described.

2. An axle box frame having side bars, axle box yokes, extensions connected therewith, arms or pedestals extending from said yokes, bearing posts guided in said pedestals, plates on said side bar and extensions, springs on said plates, plates on said springs, said posts having enlargements to bear on said last mentioned plates, bearings connecting said posts in pairs, and friction plates between said bearings and a car body, substantially as described.

3. An axle box frame having car body supporting spring side bearings, and pedestals therefor derived from said frame, and car body supporting spring end bearings between the end of the axle box frame and the car body, and an upwardly extending support therefor derived from said frame, substantially as described.

4. An axle box frame, spring supported posts carried thereby, and bearings and rub plates between said posts and a car body, combined with spring supported posts at the end of the axle box frame, and bearings and rub plates between said end posts and the car body, and an upwardly extending support therefor derived from the said frame, substantially as described.

5. An axle box frame, spring supported posts carried thereby, independently movable bearings or beams connecting said posts in pairs, rub plates placed in recesses in said bearings, and friction plates carried by a car body to co-act with said rub plates on said bearings, substantially as described.

6. A car axle box frame, spring supported posts carried thereby, independently movable bearings connecting said posts in pairs, rub plates carried in recesses in said bearings, and friction rollers carried by said bearings, combined with rub plates carried by said car body, and depending flanges for engagement with said friction rollers, substantially as described.

7. An axle box frame having side bars, yokes, and extensions from said yokes, apertured pedestals on one of said yokes, posts in said apertures, the lower ends of said posts being received within recesses or pockets upon said side bars and extensions, springs supported by said side bars and extensions and supporting said posts, and bearings between the upper ends of said posts and a car body, substantially as described.

8. An axle box frame having side bars, yokes and extensions from said yokes, apertured pedestals carried by one of said yokes, cradles or plates carried by the side bars and extensions beneath said pedestals, said plates or cradles having recessed studs to receive the ends of bearing posts, and springs on said cradles or plates for supporting said posts, substantially as described.

9. An axle box frame having side bars, yokes and extensions from said yokes, apertured pedestals carried by said yokes, plates or cradles carried by said side bars and extensions beneath said pedestals and having recesses to receive the ends of bearing posts, arms extending downwardly from said plates or cradles and straddling said side bars and extensions, and pins passing through said arms and beneath said side bars and extensions, substantially as described.

10. An axle box frame composed of side bars, yokes, extensions and cross bars, arms or pedestals extending from certain of said yokes, and a car body spring post guide or support extending upwardly and transversely from a cross bar at the end of said frame, all of said parts being derived from a single piece of metal, substantially as described.

11. An axle box frame composed of side bars, yokes, extensions, cross bars and side bearing pedestals, an end pedestal composed of upwardly extending braces, and a bridge connecting said braces, said parts being all derived from a single piece of metal, substantially as described.

12. An axle box frame having spring supported posts at its end, and an elevated pedestal for guiding the upper ends of said posts, said pedestal being derived from said frame, substantially as described.

13. An axle box frame, spring supported bearing posts at its end, a bridge to guide the upper ends of said posts, and upwardly extending bars or braces supporting said bridge on said axle box frame and derived from said frame, substantially as described.

14. An axle box frame having a cross bar, end bearing posts carried thereby and guided in apertures therein, an elevated bridge to guide the upper ends of said posts, connections between said bridge and said frame and derived from said frame, and bearings between said posts and a car body, substantially as described.

15. An axle box frame having a cross bar, upwardly extending bars or braces carried thereby and derived therefrom, and a bridge or pedestal supported by said bars or braces, said parts together inclosing a space 35, combined with end bearing posts supported by said cross bar and bridge, post supporting springs located in said space, and bearings between said posts and a car body, substantially as described.

16. A car axle box frame, upwardly extending inwardly inclined bars or braces carried thereby, a bridge or pedestal carried by said bars or braces, bearing posts guided by said bridge and supported by said frame, and bearings between said posts and the car body, substantially as described.

17. An axle box frame having an elevated bridge or pedestal at its end derived therefrom, bearing posts guided by said bridge, recessed cradles carried by said frame to receive the ends of said posts, springs resting on said cradles, and means for holding said cradles on said frame, substantially as described.

18. An axle box frame having a cross bar, an elevated bridge carried thereby and derived therefrom, bearing posts guided by said bridge, recessed cradles carried by said cross bar, depending arms on said cradles, a pin passing through said arms, one of said parts having a slot to receive said pin, said cradle having a curved under side that bears on the cross bar of said frame, substantially as described.

19. An axle box frame having a cross bar, upwardly extending tapering arms or braces carried thereby and derived therefrom, and a bridge or pedestal connected with said arms or braces, combined with spring supported bearing posts located between said arms or braces, and bearings between said posts and a car body, substantially as described.

Signed at New York, in the county of New York and State of New York, this 30th day of December, 1893.

JOHN A. BRILL.

Witnesses:
B. S. WISE,
JOSEPH L. LEVY.